US010887215B2

(12) United States Patent
Walton

(10) Patent No.: US 10,887,215 B2
(45) Date of Patent: Jan. 5, 2021

(54) ACCESSING AND ROUTING OVER A PEER-TO-PEER NETWORK

(71) Applicant: Mark A. Walton, Spring, TX (US)

(72) Inventor: Mark A. Walton, Spring, TX (US)

( * ) Notice: Subject to any disclaimer, the term of this patent is extended or adjusted under 35 U.S.C. 154(b) by 65 days.

(21) Appl. No.: 16/028,805

(22) Filed: Jul. 6, 2018

(65) Prior Publication Data
US 2019/0014037 A1 Jan. 10, 2019

Related U.S. Application Data

(60) Provisional application No. 62/529,656, filed on Jul. 7, 2017.

(51) Int. Cl.
*H04L 12/701* (2013.01)
*H04L 29/08* (2006.01)
*H04L 12/721* (2013.01)

(52) U.S. Cl.
CPC .............. *H04L 45/00* (2013.01); *H04L 45/34* (2013.01); *H04L 67/104* (2013.01)

(58) Field of Classification Search
CPC combination set(s) only.
See application file for complete search history.

(56) References Cited

U.S. PATENT DOCUMENTS

| | | |
|---|---|---|
| 6,504,503 B1 | 1/2003 | Saint-Hilaire et al. |
| 7,852,767 B2 | 12/2010 | Twiss |
| 7,890,656 B2 * | 2/2011 | Nakamichi ............ H04L 45/00 370/238 |
| 7,894,828 B2 | 2/2011 | Dawson et al. |
| 8,316,411 B2 | 11/2012 | Weintraub et al. |
| 8,909,146 B2 | 12/2014 | Kim |
| 9,104,925 B2 | 8/2015 | Manzi |
| 9,237,585 B2 | 1/2016 | Abraham et al. |
| 9,451,425 B2 | 9/2016 | Pollack et al. |
| 2004/0196808 A1 * | 10/2004 | Chaskar ............ H04W 36/0011 370/331 |
| 2007/0297417 A1 * | 12/2007 | Cohen .................... H04L 45/04 370/395.42 |

(Continued)

OTHER PUBLICATIONS

Hoeller, Sophie-Claire, This app lets you text without Wi-Fi or a data plan anywhere in the world—even on a plane, Business Insider, pp. 1-3, Aug. 14, 2015.

*Primary Examiner* — Xavier S Wong
(74) *Attorney, Agent, or Firm* — Rao DeBoer Osterrieder, PLLC; Erik J. Osterrieder

(57) ABSTRACT

ISP-free methods, systems and products may include requesting, by a requester, the information from a source, and then passing, such as pushing or pulling, the information from the requester to a controller comprising a director and an optimizer. Further, the method may include receiving instructions from at least one directory, wherein each of the at least one directory is associated with at least one router in a plurality of routers. Further still, the method may include creating, by the optimizer in communication with the at least one directory, a routing plan for routing the information over at least a portion of the plurality of routers. And, yet further, the method may include directing, based on the creating and by the director in communication with the optimizer, placement of the information on one or more of the plurality of routers. Thereafter, routing may commence without connectivity from an ISP.

21 Claims, 2 Drawing Sheets

(56) References Cited

U.S. PATENT DOCUMENTS

| | | |
|---|---|---|
| 2008/0311852 A1 | 12/2008 | Hansen et al. |
| 2012/0198032 A1* | 8/2012 | Fitzgerald ........... H04L 67/2842 709/219 |
| 2013/0115945 A1* | 5/2013 | Holostov .............. H04W 4/029 455/434 |
| 2014/0219193 A1 | 8/2014 | Linde et al. |
| 2014/0219194 A1 | 8/2014 | Varoglu et al. |
| 2014/0241315 A1 | 8/2014 | Niu et al. |
| 2014/0256250 A1 | 9/2014 | Cueto et al. |
| 2015/0024687 A1 | 1/2015 | Rawat et al. |
| 2015/0082382 A1 | 3/2015 | Maguire et al. |
| 2015/0121470 A1 | 4/2015 | Rongo et al. |
| 2015/0146722 A1* | 5/2015 | Wainner ................ H04L 45/742 370/392 |
| 2016/0157162 A1 | 6/2016 | Batta et al. |

* cited by examiner

ACCESSING AND ROUTING OVER A PEER-TO-PEER NETWORK

REFERENCE TO RELATED APPLICATION

The present application claims priority to the U.S. provisional patent application Ser. No. 62/529,656 filed Jul. 7, 2017, whereby is hereby incorporated by this reference in its entirety.

FIELD OF DISCLOSURE

This disclosure generally relates methods, systems, and computer program products for peer-to-peer ("P2P") internet for routing and accessing information, e.g., data, packet(s) of data, portions or complete files, etc. to the proper recipient, e.g., destination, device or person, either automatically or manually at certain times, e.g., when a catastrophe or outage(s) occur, or at any time.

BACKGROUND

While traditional internet traffic is routed and accessed from a computer to a router, and then to/from a modem to an internet service provider, an alternative internet protocol does not rely upon the internet service provider, but, instead, utilizes a series of routers to direct traffic to a storage device where the requested data can be collected and/or returned. Because information infrastructure is so critical to the interconnected businesses, individuals, governments and other entities in the world, interruption of the free flow of information in a single attack could knock out an entire system and leave each of the dependent entities in a desperate state. Accordingly, alternatives to traditional internet trafficking are needed to permit the routing of information to the proper recipient whenever desired, including, for instance, when a catastrophe or outage occurs.

SUMMARY

In one example embodiment, disclosed is an ISP-free method for routing information, wherein ISP-free means that an ISP does not participate in the routing of information for a portion of the routing. The ISP-free method may include requesting, by a requester, the information from a source, and then passing, such as pushing or pulling, the information from the requester to a controller comprising a director and an optimizer. Further, the method may include receiving instructions from at least one directory, wherein each of the at least one directory is associated with at least one router in a plurality of routers. Further still, the method may include creating, by the optimizer in communication with the at least one directory, a routing plan for routing the information over a least a portion of the plurality of routers. And, yet further, the method may include directing, based on the creating and by the director in communication with the optimizer, placement of the information on one or more of the plurality of routers.

In another example embodiment, disclosed is an ISP-free system for routing information. The ISP-free system may include a requester for requesting information from a source, and a controller, in communication with the requester, for receiving the information from the requester, wherein the controller comprises a director and an optimizer. Further, the system may include at least one directory, associated with at least one router in a plurality of routers, for receiving instructions. Further still, the system may include the optimizer, in communication with the at least one directory, for creating, a routing plan for routing the information over at least a portion of the plurality of routers. And, yet further, the system may include the director, in communication with the optimizer, for placing the information on one or more of the plurality of routers.

Yet another aspect of this disclosure is shown by another example embodiment for a computer program product for routing information without an ISP connection to the internet. The computer program product may include a computer readable memory and a computer readable storage device in combination with a plurality of program instructions that may include the following in addition to others: first program instructions to request, by a requester, the information from a source; second program instructions to pass the information from the requester to a controller comprising a director and an optimizer; third program instructions to receive instructions from at least one directory, wherein each of the at least one directory is associated with at least one router in a plurality of routers; fourth program instructions to create, by the optimizer in communication with the at least one directory, a routing plan for routing the information over at least a portion of the plurality of routers; and fifth program instructions to direct, based on executing the fourth program instructions for creating and by the director in communication with the optimizer, placement of the information on one or more of the plurality of routers. The first, second, third, fourth, and fifth program instructions are stored on the computer readable storage device for execution by the one or more processors via the computer readable memory.

BRIEF DESCRIPTION OF THE DRAWINGS

So that the manner in which the above recited features, advantages and objects of the present invention are attained and understood, a more particular description of the invention, briefly summarized above, may be had by reference to the embodiments thereof which are illustrated in the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION OF THE EMBODIMENTS

Figure 1:
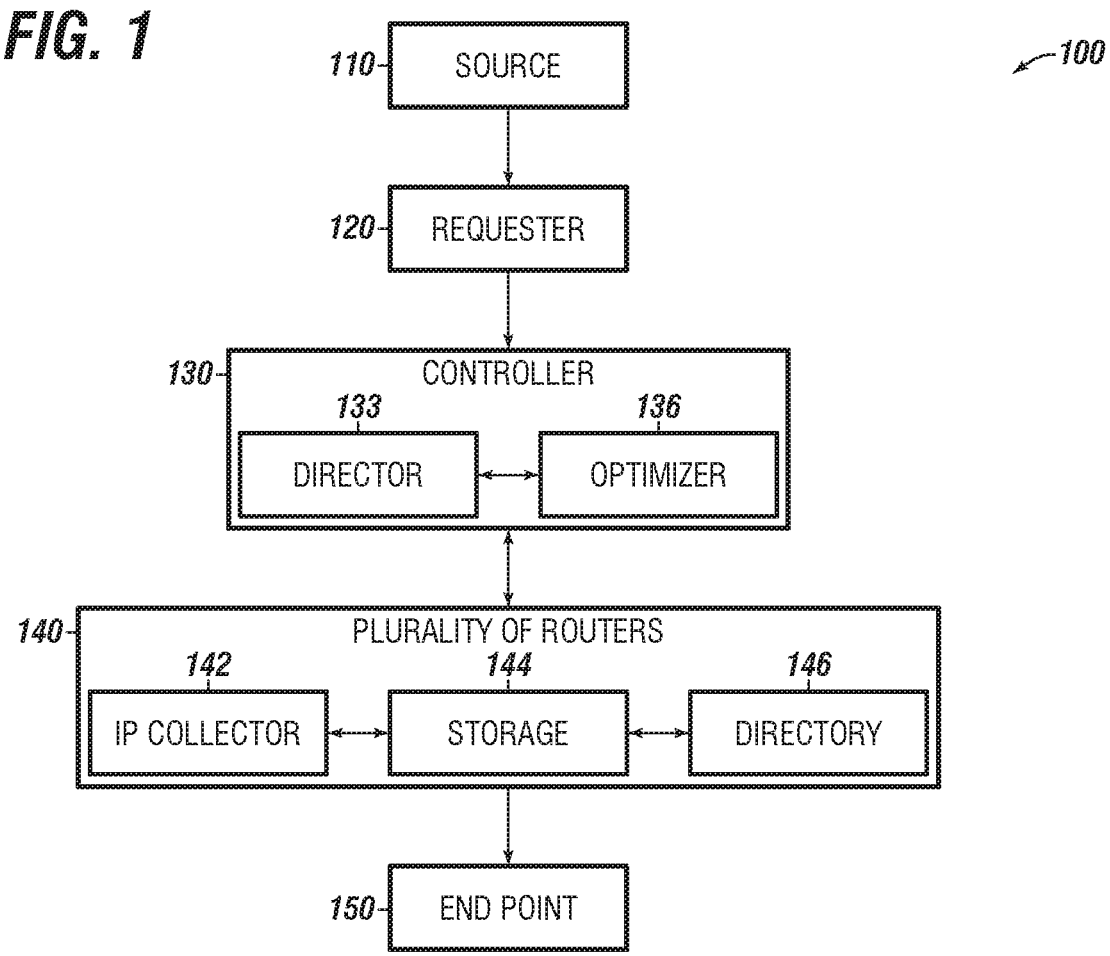
FIG. 1 depicts an example embodiment of a source, requester, controller, plurality of routers or nodes, and an end point, which may be a router, computer, the Internet, or otherwise for use or in operation with the methods, systems, and computer program products disclosed herein.

The following is a detailed description of example embodiments of the invention depicted in the accompanying drawings. The embodiments are examples and are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

In addition, directional terms, such as "above," "below," "upper," "lower," "front," "back," "top," "bottom," etc., are used for convenience in referring to the accompanying drawings. In general, "above," "upper," "upward," "top," and similar terms refer to a direction away from the earth's surface, and "below," "lower," "downward," "bottom," and similar terms refer to a direction toward the earth's surface, but is meant for illustrative purposes only, and the terms are not meant to limit the disclosure.

An exemplary computer system, such as that within the client device and/or on the server-side, for use with the disclosed methods and systems may include a processor, which is coupled to host bus coupled to cache memory. A host-to-personal computer interface (PCI) bridge is coupled to main memory, which includes cache memory and main memory control functions, and provides bus control to handle transfers among the PCI bus, processor, cache, main memory, and host bus. A PCI bus provides a standard interface for connecting peripherals, such as a local area network card. A PCI-to-industry standard architecture (ISA) bridge functions as a PCI target on the PCI bus to manage transfers between PCI bus and ISA bus, universal serial bus functionality, integrated drive electronics device functionality, power management functionality, a real-time clock, direct memory access control, interrupt support, and system management bus support. Peripheral devices and input/output devices may be attached to various interfaces, e.g., parallel interface, serial interface, infrared interface, keyboard interface, mouse interface, fixed disk, and removable storage device, coupled to ISA bus.

Basic input/output system is coupled to the ISA bus, and incorporates the necessary processor executable code for a variety of low-level system functions and system boot functions. BIOS may be stored in any computer readable medium, including magnetic storage media, optical storage media, flash memory, random access memory, read only memory, and communications media conveying signals encoding the instructions, e.g., signals from a network. In order to attach the computer system to another computer system to copy files over a network, a local area network card is coupled to PCI bus and to PCI-to-ISA bridge. Similarly, to connect the computer system to an internet-service provider ("ISP") to connect to the Internet using a telephone line connection, a modem is connected to a serial port and the PCI-to-ISA Bridge.

While the foregoing computer systems are capable of executing the disclosure described herein, these computer systems are simply examples of computer systems and user computer systems. Those skilled in the art will appreciate that many other computer system designs are capable of performing the disclosure described herein.

Another embodiment of the disclosure may be implemented as a program product for use within a device such as, for example, those above-described methods and systems. The program(s) of the program product defines functions of the embodiments (including the methods described herein) and may be contained on a variety of media including but not limited to: (i) information permanently stored on non-volatile storage-type accessible media, e.g., write and readable as well as read-only memory devices within a computer such as read-only memory, flash memory, CD-ROM disks readable by a CD-ROM drive; (ii) alterable information stored on writable storage-type accessible media, e.g., readable floppy disks within a diskette drive or hard-disk drive; and (iii) information conveyed to a computer through a network. The latter embodiment specifically includes information downloaded onto either permanent or even sheer momentary storage-type accessible media from the World Wide Web, an internet, and/or other networks, such as those known, discussed and/or explicitly referred to herein. Such data-bearing media, when carrying computer-readable instructions that direct the functions of the present disclosure, represent embodiments of the present disclosure.

In general, the routines executed to implement the embodiments of this disclosure, may be part of an operating system or a specific application, component, program, module, object, or sequence of instructions. The computer program of this disclosure typically comprises a multitude of instructions that may be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of this disclosure. However, it should be appreciated that any particular program nomenclature that follows is used merely for convenience, and, thus, this disclosure should not be limited to use solely in any specific application identified and/or implied by such nomenclature.

While traditional internet traffic is routed from a computer to a router, and then to/from a modem to the internet service provider, the disclosed alternative internet routing protocol ("AIRP") does not rely upon an internet service provider ("ISP"), but, instead, utilizes a series of routers and devices to direct traffic to a storage device where the requested data may be collected and returned. The disclosed solutions, e.g., methods, systems, and computer program products, allow for free-flowing connection of information across a P2P interconnection of technology-based devices without an ISP.

Traditional internet connectivity may become strained, reduced, constricted, restricted, or otherwise overly regulated such that alternative forms of communication are preferred or necessary. AIRP may occur through the interaction of each device through one or more types of interconnections, wherein such types may include P2P, satellite, power lines, Bluetooth®, Wi-Fi, and/or traditional or other advanced technological methods that have yet to be made widely available.

The information, itself, for routing in and over the P2P methods and systems, respectively may be files, media (streaming or non-streaming), websites, or any other data that may be accessed through the traditional internet. And, retrieval of information may be through use of a torrent type of communications protocol, such as BitTorrent®, where parts of the information, i.e., the target item, may be retrieved through one method and other part(s) may be retrieved through other method(s).

Reasons for gathering the information in this way may be privacy, speed, security, integrity, access, or any other reason causing alternative communications protocols to be used. Security of connection and anonymity of data collection and target acquisition may become desirable. In this case, the information may be collected in an anonymized, masked or seemingly random manor in order to allow for the free flow of information without bad actors having a chance to intercept or identify the activity, and, thereby, allowing the user to operate securely and confidently.

Reasons for the disclosed technology, employed either manually or automatically, is for use as an alternative means to route information over an alternative method, system, and computer program products as compared to the internet, back-up, or redundancy, such as for a business, which Businesses may require redundancy for any number of reasons. Another reason may be server access, client data access or IP phones. In the time of an outage, such as after a hurricane, a business may be required to gain access to client information in adverse conditions. For example, if an insurance agency location has been through this hurricane, it may still need to be able to access data records and file claims for its insureds. Redundancy in connectivity methodologies may allow for this to happen.

The disclosed P2P solutions may disseminate crucial, web-traffic controls in order to allow for proper routing and/or restricted routing of data. In one example case, a router may know, through enabling logic reduced to hardware and/or software just as a router or any other piece of equipment does, knows, or determines anything in this disclosure, that a distributed-denial-of-service ("DDoS") attack is happening and react to this in appropriate way(s). The network of P2P routers may also be able to route around a particular source of DDoS attacks or even operate as a firewall closer to the source allowing the target to avoid the brunt of the disturbance. Additionally and alternatively, the network may also be able to pause all traffic for a period of time. For example, if there is an attack to the system, the P2P network could be configured to automatically timeout for a period of time to avoid further damage from this attack.

Domain name server ("DNS") system risks to businesses have become problematic through DDoS attacks or websites being misappropriated. This may cause a web-dependent business significant harm. The risk associated with this may be avoided by using an alternative DNS protocol to verify the proper location of the target site. In other words, if a DNS location is compromised, a business, individual, government agency or any other entity with a website may be able to communicate to a network of routers with what the correct or new location of the target domain would be. For example, suppose the website of www.widget.com and it has 10.10.10.10 as its internet protocol ("IP") address. If this website is compromised, then the network of its routers would be told where to send the traffic so widget.com may operate still. Instead of sending the traffic to 10.10.10.10, it would instead send it to a new, assigned IP address. This re-direction could be handled through enabling logic, reduced to hardware and/or software, associated with the routers themselves on a P2P system or even located and accessible within a centralized repository. The routers then know where to send the traffic and widget.com will not lose business.

The P2P network is able to determine if a particular domain extension such as .com, .net, .gov or otherwise is compromised and may route all traffic to a new extension such as .com2, .net2, .gov2, etc. This may allow the traffic of information to continue while the interruption is cleared, isolated, or otherwise remediated.

The P2P network has logic that learns the IP addresses associated with the DNS and domain extensions as the information is propagated throughout the internet or P2P network. This intelligence allows for a much quicker and even enable the redirection of the traffic.

The P2P network may include decentralization of the information. That is, for example, each router may have a certain amount of storage from the internet generally. New information may be found and/or stored in redundancy for quicker capture and retrieval. Certain secure information may remain encrypted or secured and only allow access based on credentials, passwords, keys or other means of ensuring only proper access is allowed.

In one example, bank account information may be spread across hundreds of routers. In order to complete a bank account information file, it may require, for example, communication involving 25 routers. In each case, one of the routers, or maybe multiple routers may direct the router seeking the information to the others. When this information is compiled, a key may be required to open it. In another example, the key may be required to find the next router and so forth. In such a case, maybe 25 keys are required to find and unlock each of the file fragments in order to make a whole file. This increases security dramatically.

In order to capture information and populate the decentralized routers or servers with the data required to allow for this to work, there may initially need to be an end point where a router would access the internet. For example, this may be a gateway. In this case, consider an occurrence where a sovereign government is under attack and the internet is closed to the country. There may be a router or series of routers close enough to the border where access to the broader internet is accessed from a point over the border. In this case, the data may be filtered through and brought into the series of routers with broader access.

This P2P may be used specifically for file storage and/or secure access. In such case(s), the static nature of storage may allow for the data to be secure and the disparate locations of the file fragments may allow for continued security. While website functionality or other updated information may come from a particular IP, the data behind it may be transferred through torrent or other P2P communication transfer methodologies. For example, if you log into your Wells Fargo bank account, you may use the interface that the bank has on its site, but the information provided may be in decentralized routers to which only your login permits access. At the time of login, your account may be compiled locally, on your computer, based on the credentials or other identifying criteria.

Identifying criteria may be your IP address, known computer model, software version, biometrics, geographic location, security question, key, or any other identifiable criterion. When the identifying criteria is matched up, then the torrent or P2P network may guide you to where the data is, alert the owner of a potential breach, alert authorities, unlock the data, delete the data, display the data or any other series of potential actions.

The router, itself, may be able to access both the traditional internet protocol as well as the AIRP, which includes a plurality of routers and/or other smart devices having locally or remotely associated logic for partially or completely implementing instructions, routing, storing, fragmenting, compiling, querying and determining routing path of information. A user may not know when the router is using the alternative internet. In some embodiments, the user may choose to be alerted or notified when the alternative internet is accessed.

When the router is being used, the router may be configured to access the most appropriate information in a way that allows for the best access. The best access may be the most secure, fastest or the most stealth. The best access could also be any other sort of desirable transmission outcomes. Defaulted or configurable logic may define what "best access" means for the alternative internet, which is also known in this disclosure as the P2P Internet.

A router in this P2P environment may also be used to send or receive emails or other files. In this case, a fragment may be sent to hundreds of routers and a key is used by the recipient to access each of the fragments. In another case, the sender may send a request to a recipient for a key, and then send out the fragments using this key. In this case, only that recipient would be able to open or access the fragments to rebuild the file. In yet another case, a reputation or authentication by the peer network could be built and allow this reputation to drive the authority to receive or send the data or key. In other words, if each of the routers or plurality of the routers can confirm the authenticity of a sender or recipient, it may allow the data to flow. If this cannot be independently authenticated, the information may not flow and disallow the compilation of the file fragments.

In the foregoing example, one scenario could be a sender who wants to deliver a message to a recipient. The recipient has a known, tenured address to which a notification is sent. The recipient responds with an acknowledgement including a key to the encryption. The sender may then send the file fragments to the P2P network and the recipient may then collect the information and compile the data to reform and unlock the file for full access.

The routers may communicate with one another in any know form of communication. Some of the obvious ways are Wi-Fi, Bluetooth®, land line, traditional internet, electric line, cable line, satellite, RFID, NFC, fiber optic or any other form of communication.

Once the routers are in concert, each may have the opportunity to be programmed to prefer certain methods over another. For example, one router may be programmed to prefer the traditional internet and only use AIRP as the secondary source. Another router may be programmed to use the AIRP as the primary and only use the traditional net as the backup or secondary.

While using the alternative or traditional net, the routers may have logic to learn what to keep and store locally versus what to store on other devices and routers. Each router may be able to determine where to store files or file fragments, even if it is not on the router itself. In other words, a router may store a percentage of data for itself and allow other routers to store file fragments on an ad hoc basis. In this particular case, the router would be able to keep, for example, 25% of the storage for its own purposes while the other 75% is consumed by the community of routers and/or other devices. The router may then choose to store certain files in other routers by way of fragments or whole files, depending on the needs and/or storage capacities and capabilities.

In order to determine which information to store locally or remotely, the router may ascertain the frequency of information usage. In other words, if users in a given area have a propensity to access huffpo.com or foxnews.com, then the information from these sites may be stored locally. This storage could be in a cache format or it could be stored in an archive or an active storage. These levels of storage may be determined by the number of times the data is accessed or it could be decided that all data should be stored at multiple levels such as active, inactive, archived or any other level.

The area or geography may be by a physical geography or degrees of separation. If data is frequently accessed within a group of peers, the degree of separation may be 1. If there is no other peer accessing certain data, the degree of separation may be greater than 1. This degree of separation or area may help to determine the storage location of the data.

The router may also be able to determine how much redundancy is required. This determination may be by network reliability, security level, number of fragments, file size, or any other determination method.

A router, itself, may be a traditional router, switch, computer, computing device, individual, entity, drive or any other transmitting, receiving, transceiving, storing or other type of device.

The disclosed solutions may also create a roadmap to the data being requested. Whether the file is obscurely or well known, the network of peers may be able to easily locate the file and its fragments through a peer-to-peer directory stored and accessed on a plurality of routers and/or storage devices.

This data storage may be designed in such a way that the information is stored and decentralized in an organized way. For example, all files that start with the letter A may be broken apart among routers within a defaulted or configurably selected set. All files beginning with the letter B may be fragmented in another set of routers. If a file fragment is not located at a particular router, then a signal is sent to another location with the particular organizational indicator, such as the letter A or B. The signal may continue to seek or be directed until the correct router is located that has the required file fragment. Upon discovery of the required file fragment, the data may be sent back to the router seeking the information. This may also include directions, map or key to finding the balance of the file fragments. This allows for quicker target acquisition.

Another use of the disclosed solutions would be to limit access to a greater degree. Since requests for data are sent to the internet or alternative internet in order to seek responses of file fragments, then it is possible for associated logic to limit the access points to which the information is able to return. For example, if the user is limited or allows only 10 IP addresses for information to come back through, then the opportunities for hacking are greatly reduced. The access points for return of information may also be a rolling access point or a series of access points. In the case of a rolling access point, the logic may say to run it through router x during this time of day and run it through router y during another time of day. Rolling access points may be configured to roll or change based on any number of configurations such as time of day, size of file, security level required, file structure, or any other desirable parameters. This access limitation may reduce hacking and increase security.

Additional logic associated with the AIRP may permit only certain routers with a key to open up directions for routing. Those routers having key(s) may be mapped based on reputation of the router(s) within the community or simply using certain router(s) within the community by designation or selection. In one example, the home router being used currently may request information and send it to one of 100 nearby routers. That router may be the only one with the key to open the return-path instructions. When this router opens the return-path instructions, it may then send the request to the internet for the required information and return the information via the particular return path designated. This may be configured to garner better efficiencies, such as reducing the number of redirections within the ecosystem in order to accomplish faster download capability. It may also use a combination of traditional internet and alternative internet to capture and return this information.

The router may split traffic according to the ownership of the data. In other words, the router may have a public persona for relaying information as well as a local user for going out and getting information. In this case, the local user may use part of the router system to send requests for the information, while the public persona is used to relay information for other users on the alternative internet. This data system may likely be a separate operating environment. In the case of this separate environment, the router may have two different modes of communication. One may be to gather the information for the other users. The second may be to gather information for the local user. It may even be possible for the local user to use his own public persona to be the interface to gather the information.

If the data is not returned in its entirety, the data may be requested again. This may be repeated several times before the entire data set is returned. This may also be in the format that allows for file fragments to be requested individually.

The data may be structured so that the request may go out for certain fragments through certain routers. For example, suppose that the file is broken into 5 pieces. Each piece is named 1, 2, 3, 4, or 5. Here, the router may request piece 1, 2 and 5 from one router and 3 and 4 from another router. If 2 is never returned but the others are, then 2 may be requested again and when the fragments are returned, the entire file is built and presented.

An access point would be either a port inside the local router or it may be data from another router or series of routers. For example, if the user wants to bring data back to its local router, the outgoing message may dictate where the information needs to be returned in order for it to make it back. This could be a series of routers or a single router. It may also require a certain degree of separation to allow for this to be returned.

Servers may operate in the same sort of way as just discussed with regard to routers. If access is requested, there may be a tool by which access is requested, authenticated and granted by the user group based on some sort of reputation requirement or requirements.

Servers may also act as a gateway for certain information or even be configured to be the integration point between the traditional and the alternative internets. In this case, the information may be streamed more efficiently or the server could even be the one that compiles the data, and, if it is trusted, may be able to stream the data directly to the end point. This server or router would then allow for a more direct access point to the information and allow the compilation burden to be managed by the server or router instead of a local computer or user.

The servers, routers, or other smart devices may also be the delineation point between internet traffic and intranet traffic. Servers or certain routers may be designated points where both the traditional internet and the alternative internet are joined together. While the typical configuration may be for each router to be able to access both the alternative and traditional internet, it may come to pass that having a server or certain key routers may be the only point where both begin to move together.

The reputation in this regard may have multiple levels. There may be a peer-to-peer reputation review or it may be done based on proximity, manual configuration, longevity in the community or any number of other ways.

The router may also be a computer so that the internet may be accessed by the computer directly to any other router. The computer may also have a public persona allowing others to gather data using this.

A router in this environment may only have a public person or simply an access point to be able to send requests for information. This is more likely going to be a server or a computer where the user does not have the power to be able to continue to allow access through the router at all times.

Access limitation may become an important functionality. There may be certain users where the community does not wish to allow access. This access may be limited by blocking a particular user's router or access point. It may also deny return of information when the files and file fragments are requested. Another case may be the designated nearby router is notified of the community deciding not to allow access any longer and it simply blocks the request from returning or transmitting.

The community may be a group of users, the administrator, group of routers, group of computers, a single entity or the collective.

In a real-world deployment example, the solutions may be uploaded to an existing router that communicates by way of radio frequency to the other nearby devices.

While the disclosed solutions may connect by way of Bluetooth®, Wi-Fi, hardwire or any other means, another form of connection may be by radio frequency ("RF").

Security systems rely on traditional networks. If there is an outage in the area and the security system may no longer communicate with a service center, the location being secured is then vulnerable. Specifically, the system may rely upon a landline as the primary source of connectivity and cell as a backup. If the provider is the same for both solutions, there is a chance that an outage in the area may impact both. With P2P Internet solutions, connection and delivery of the signal or message through a neighboring device on another network are contemplated.

Emergency response networks may be bolstered dramatically in the time of an outage. For example, if there is an outage in a particular area due to natural disaster, brownout, war or even a football game, this network of devices and access points may carry the load. As an example, if a user is at a football game and is unable to get a call to go through, the phone may use an alternative to the typical cell phone technology, and, instead, use a P2P solution where the call would go from the phone, to another phone, to another phone and so on until reaching an access point where the connection may be made allowing the call to be placed. Phone calls may be made possible similarly to the IP phone system currently being used by many companies and individuals. In the P2P Internet environment, the necessity of having a traditional phone communication is supplanted by the disclosed methods, systems and computer program products. That is, the phone call, i.e., information, is routed via the methods, systems and computer program products provided in this disclosure, e.g., according to FIGS. 1 and 2, wherein the phone call is the information from a source 102 that is provided to/requested by the system 100.

Map to the nearest access point may be geocoded. Access points may be mobile as well. While using the network, the strength of the access point may be important. If there is a stronger access point at a particular physical location, there may be a map to that location. For example, if there are a series of mobile access points, such as cell phones, mobile equipment, vehicle Wi-Fi, or the like, concentrated in a particular location, the user may be directed to that physical location in order to get the best access and service.

Messages and traffic may be intermittent and the system may allow for this through snapshots and gathering or sending the packets of information in waves. In this particular case, we may see that a series of file fragments are being delivered to a user. One day the user may receive half of the file fragments and then lose connection to the network. The next day the balance of the file fragments may be delivered when the connection is restored.

The protocol used may be to strip off the TCP/IP header and replace that for the file fragments based on the path chosen. This method may be used on both the request for the information and the return of the information. In this particular case, the path may be determined by the new header.

Alternatively, the fragment may be given its own header to direct the path to the target recipient of the packet and ultimately the file.

In another example of how this may be deployed is in regard to the OSI model. In the OSI model, the final layer or physical link, would be the P2P network itself. In this case, the data is moved about the physical link by way of adding a path in the header for that data transmission over the physical link layer. Here the solutions, essentially, may add one more layer to the OSI model. This additional layer would break the file into the file fragments and direct each fragment across the physical link along varying or identical paths. The file may then be recompiled by the target recipient.

With the OSI model, this additional layer may be inserted into the protocol stack, added to the end, or even managed within the application itself. There are benefits to each option such as the efficiency of having the routing hardware manage the conversions and header protocol. Decompiling the file fragments before it gets to the final layer may add more security.

There may be a drone recipient used in order to redirect or relay the file or fragment allowing for another layer of security. In this particular case, the target recipient of the information may appear to be one destination but that destination may be configured to recognize that if a file comes to that device at a particular time in a particular way, it knows how to redirect the file. This may be thought of as a secret password to be allowed entry. If the sender fails to deliver the information in a certain way, the file path may be broken, the file may not get delivered or it may be sent to another location. This may be particularly useful for anti-spamming, filtering and access security.

Access without compromising the intranet of a peer user is likely important. Because of the partitioning of the accessible data transmission and the optional data storage, this integrity is possible. Here the user of the P2P Internet may have free flow access to the internet while the local host may have no risk of losing information or unauthorized access to his local network. In this case, received information may have to come in from multiple neighboring devices through a secured antenna while the freely flowing information from the P2P Internet would come across another antenna within the same piece of hardware. These two data streams would be processed separately. The P2P stream of information may be a larger pipeline of data as opposed to the locally accessed information, which may be more limited in capacity.

Turning now to the figures, disclosed are example embodiments that are not limiting in any way but purely illustrative of possible embodiments through this disclosure as understood in view of the existing art and by one of ordinary skill in the art.

FIG. 1 depicts a system 100, which naturally includes attendant methodologies and executable instructions for optional execution in order to implement accessing and routing of information over an alternative to the internet. The source 100 may include any device, stream, signal, website or combination thereof containing information. The requester 120, having associated, enabling logic reduced to hardware and/or software, comprises device(s) in communication with the source 100, whereby the requester 120 requests the information, e.g., file(s) or portions thereof.

A controller 130, such as a one using a torrent communications protocol and/or other protocol(s), receives the request for the source's 110 file(s) and has associated, enabling logic for requesting and receiving instructions from a directory 146 associated with a plurality 140 of smart devices, e.g., routers, that comprise part of the alternative internet network 100 for accessing and/or routing at least part of the requested file(s) without using an ISP, i.e., conventional internet, for at least part of the accessing/routing of the requested file(s). The instructions may include, for example, availability of routers, a mapping of routers by location, and/or storage capacities of routers for possible use in the routing. The availability of routers information may come from IP collector(s) 142 that store whether one or more routers are under DNS attack, periods of operation, bandwidth, transmission rates, etc. Some or any of the smart devices in the plurality 140 of routers may include storage 144 that is volatile and/or non-volatile.

Upon receipt of the instructions from the directory 146, further enabling logic associated with the optimizer 136 may determine an optimized routing path based on proximity, reputation, availability, and/or storage 144 of routers 140. Thereafter, execution of the routing or accessing of the information may occur, whether partly or completely.

The controller 130 may include a director 133, in communication with the optimizer 136, that contains enabling logic to push file segment(s) of the requested file(s) onto one or more routers among the plurality 140, and updates the same or another directory 133 in communication with the routers 140 in order to track the location of the file segment(s) during the routing. Thereafter, the system 100, methods and computer program products may terminate at an end point 150, which is where the requested file(s) may be transferred to a device, re-compiled, connect or reconnect with the internet for optionally continuing routing, and/or respond to the requested 120 information with answer(s) to the requester 120 and/or source 110 that may use of the system 100, methods and computer program products or otherwise. As depicted, the end point 150 is a device outside AIRP communications, but in other embodiments, the end point may be a router or other smart or dumb device(s) that receives the AIRP communications.

Figure 2:
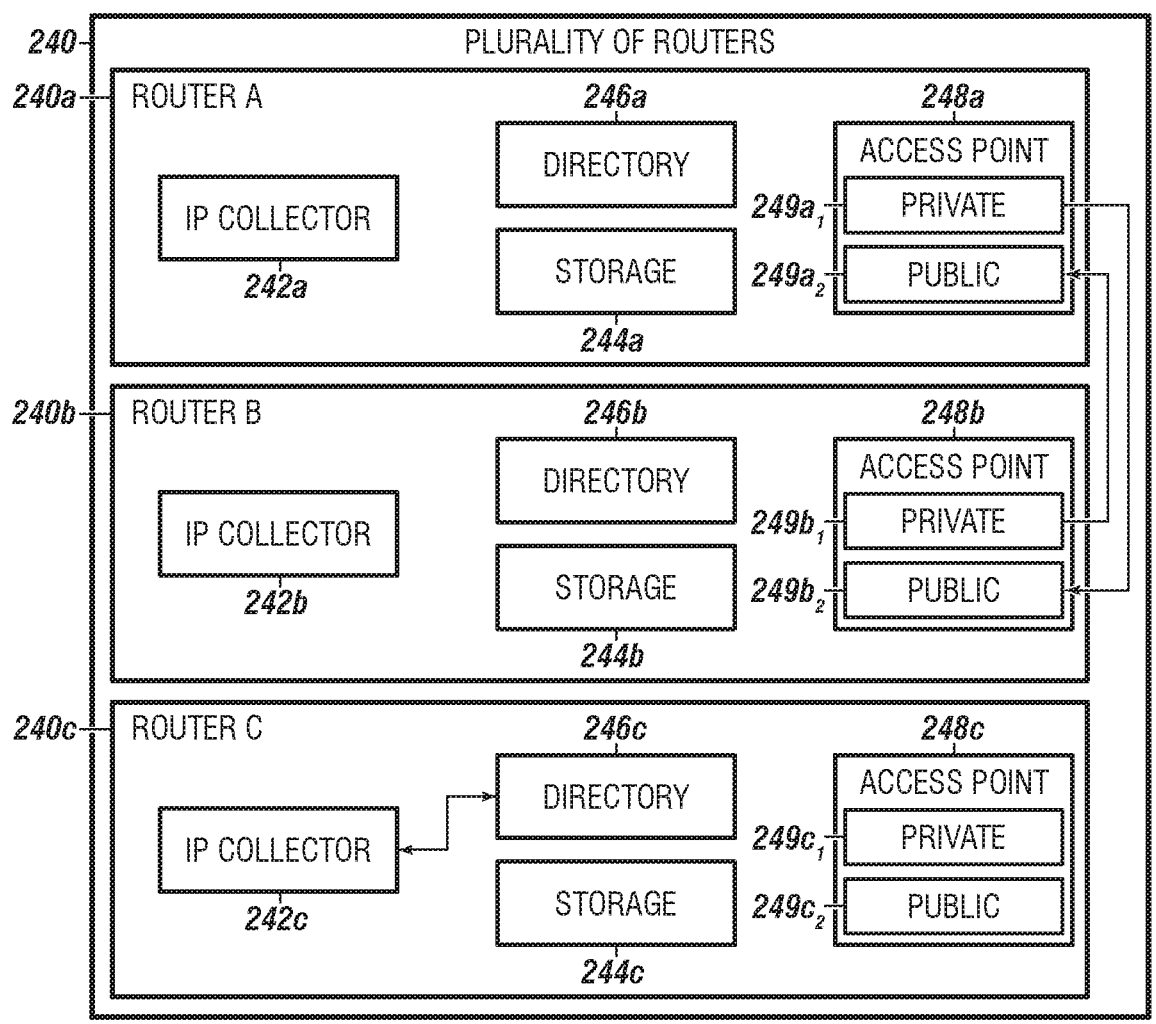
FIG. 2 depicts an example embodiment of an expanded view of a plurality of routers or nodes, and an end point, which may be a router, computer, the Internet, or otherwise for use or in operation with the methods, systems, and computer program products disclosed herein.

FIG. 2 depicts a more granular display of different routers subject to AIRP communications of file segment(s) over the disclosed system 100, methods and computer program products. In particular, each router 240a, 240b, 240c possesses an access point 248a, 248b, 248c having private $248a_1$, $248b_1$, $248c_1$ and public $248a_2$, $248b_2$, $248c_2$ sections that do not talk to each other, but otherwise may be in communication with one or more of a router's 240a other components, e.g., IP collector 242a, storage 244a and/or directory 246a. As shown for example, a file segment(s) is routed from a private $248b_1$ section of the router's access point 248b to a public $248a_2$ section of a different router's 240a access point 248a, wherein the receiving router 240a must have the private key necessary to open the private $248b_1$ access point 248b of the discloser 240b in order to receive that private-keyed $248b_1$ file segment. Key information may be stored in any one or more directories 246a, 246b, 246c and rights to key(s) by router(s) 240a, 240b, 240c may be configurably granted.

Further example embodiments of this disclosure are provided below.

1. An ISP-free method for routing information, comprising:
   requesting, by a requester, the information from a source;
   passing the information from the requester to a controller comprising a director and an optimizer;
   receiving instructions from at least one directory, wherein each of the at least one directory is associated with at least one router in a plurality of routers;

creating, by the optimizer in communication with the at least one directory, a routing plan for routing the information over at least a portion of the plurality of routers; and directing, based on the creating and by the director in communication with the optimizer, placement of the information on one or more of the plurality of routers.

2. The ISP-free method of claim 1, further comprising routing or accessing the information based on the directing.

3. The ISP-free method of claim 2, wherein the routing comprises routing the information over the at least one router in a plurality of routers as an intact file.

4. The ISP-free method of claim 2, wherein the routing comprises subsequent purging of the intact file on one or more routers in the plurality of routers involved in the routing of the information.

5. The ISP-free method of claim 1, further comprising breaking-up the information into one or more packets for the routing.

6. The ISP-free method of claim 1, further comprising storing one or more portions of the information on one or more of the at least one router in the plurality of routers.

7. The ISP-free method of claim 1, further comprising accessing, by a second router public section of a second access point on a second router, a first portion of the information accessed through a first router private section of a first access point on a first router, wherein the first router and second router are among the plurality of routers.

8. The ISP-free method of claim 5, wherein the accessing is for routing the information over the plurality of routers.

9. The ISP-free method of claim 5, wherein the accessing comprises accessing subsequent to the second router using a key to open the first router private section.

10. The ISP-free method of claim 1, further comprising compiling the information subsequent to routing the information over at least one router in the plurality of routers.

11. The ISP-free method of claim 1, further comprising connecting to an ISP subsequent to routing the information over at least one router in the plurality of routers.

12. The ISP-free method of claim 1, further comprising responding, over at least one router in the plurality of routers, to the source, requester, or both with a response to at least part of the information routed over the least one router in the plurality of routers.

13. The ISP-free method of claim 1, wherein the creating comprises creating based on availability, reputation, proximity, storage capacity, or any combination thereof of each of the at least one router in the plurality of routers.

14. The ISP-free method of claim 1, wherein the creating comprises creating, based on data associated with at least one IP collector in communication with the optimizer, wherein the data comprises availability information about one or more routers in the plurality of routers.

15. The ISP-free method of claim 1, wherein the receiving comprises receiving, pursuant to requesting, the instructions through use of one or more communication protocols, optionally comprising a torrent-based communication protocol.

16. An ISP-free system for routing information, comprising:
a requester for requesting information from a source;
a controller, in communication with the requester, for receiving the information from the requester, wherein the controller comprises a director and an optimizer;
at least one directory, associated with at least one router in a plurality of routers, for receiving instructions;

the optimizer, in communication with the at least one directory, for creating, a routing plan for routing the information over at least a portion of the plurality of routers; and the director, in communication with the optimizer, for placing the information on one or more of the plurality of routers.

17. The ISP-free system for routing information, wherein the ISP-free system routes the information over the at least one router in the plurality of routers.

18. The ISP-free system for routing information, wherein each of at least one router in the plurality of routers involved in the routing of the information comprises an access point, wherein the access point for the each optionally comprises a public section and a private section.

19. A computer program product for routing information without an ISP connection to the internet, the system comprising:
a computer readable memory and a computer readable storage device;
first program instructions to request, by a requester, the information from a source;
second program instructions to pass the information from the requester to a controller comprising a director and an optimizer;
third program instructions to receive instructions from at least one directory, wherein each of the at least one directory is associated with at least one router in a plurality of routers;
fourth program instructions to create, by the optimizer in communication with the at least one directory, a routing plan for routing the information over at least a portion of the plurality of routers; and
fifth program instructions to direct, based on executing the fourth program instructions for creating and by the director in communication with the optimizer, placement of the information on one or more of the plurality of routers,
wherein the first, second, third, fourth, and fifth program instructions are stored on the computer readable storage device for execution by the one or more processors via the computer readable memory.

20. The computer program product of claim 19, further comprising sixth program instructions for routing the information over the at least one router in the plurality of routers, wherein the sixth program instructions are stored on the computer readable storage device.

While the foregoing is directed to example embodiments of the disclosed invention, other and further embodiments of the invention may be devised without departing from the basic scope thereof, and the scope thereof is determined by the claims that follow.

What is claimed is:

1. An internet service provider (ISP)-free method for routing information, comprising:
requesting, by a requester, the information from a source;
passing the information from the requester to a controller comprising a director and an optimizer;
receiving instructions from at least one directory, wherein each of the at least one directory is associated with at least one router in a plurality of routers;
creating, by the optimizer in communication with the at least one directory, a routing plan for routing the information over at least a portion of the plurality of routers, wherein the routing plan is based on at least two of availability, reputation, proximity, and storage capacity of each router in the at least a portion; and directing, based on the creating and by the director in communication with the optimizer, placement of the information on more than one of the plurality of routers.

2. The ISP-free method of claim 1, further comprising routing or accessing the information based on the directing.

3. The ISP-free method of claim 2, wherein the routing comprises routing the information over the at least one router in a plurality of routers as an intact file.

4. The ISP-free method of claim 2, wherein the routing comprises subsequent purging of the intact file on one or more routers in the plurality of routers involved in the routing of the information.

5. The ISP-free method of claim 1, further comprising breaking-up the information into one or more packets for the routing.

6. The ISP-free method of claim 5, wherein the accessing is for routing the information over the plurality of routers.

7. The ISP-free method of claim 5, wherein the accessing comprises accessing subsequent to the second router using a key to open the first router private section.

8. The ISP-free method of claim 1, further comprising storing the information on the more than one of the plurality of routers.

9. The ISP-free method of claim 1, further comprising accessing, by a second router public section of a second access point on a second router, a first portion of the information accessed through a first router private section of a first access point on a first router, wherein the first router and second router are among the plurality of routers.

10. The ISP-free method of claim 1, further comprising compiling the information subsequent to the directing.

11. The ISP-free method of claim 1, further comprising connecting to an ISP subsequent to the routing the information over at least one router in the plurality of routers.

12. The ISP-free method of claim 1, further comprising responding, over at least one router in the plurality of routers, to the source, the requester, or both with a response to at least part of the information routed over the least one router in the plurality of routers.

13. The ISP-free method of claim 1, wherein the creating comprises creating based on at least three of the availability, reputation, proximity, and storage capacity, of each router in the at least a portion.

14. The ISP-free method of claim 1, wherein the creating comprises creating, based on data associated with at least one IP collector in communication with the optimizer, wherein the data comprises availability information about one or more routers in the plurality of routers.

15. The ISP-free method of claim 1, wherein the receiving comprises receiving, pursuant to requesting, the instructions through use of one or more communication protocols.

16. The ISP-free method of claim 1, wherein the creating comprises creating based on at least the availability, reputation, proximity, and storage capacity of each router in the at least a portion.

17. An internet service provider (ISP)-free system for routing information, comprising:
a requester for requesting information from a source;
a controller, in communication with the requester, for receiving the information from the requester, wherein the controller comprises a director and an optimizer;
at least one directory, associated with at least one router in a plurality of routers, for receiving instructions;
the optimizer, in communication with the at least one directory, for creating, a routing plan for routing the information over at least a portion of the plurality of routers; and
the director, in communication with the optimizer, for placing the information on more than one of the plurality of routers.

18. The ISP-free system of claim 17 for routing information, wherein the ISP-free system routes the information over the at least one router in the plurality of routers.

19. The ISP-free system of claim 17 for routing information, wherein each of at least one router in the plurality of routers involved in the routing of the information comprises an access point, wherein the access point for the each comprises a public section, a private section, or the public section and the private section.

20. A computer program product for routing information without an internet service provider (ISP) connection to the internet, the computer program product comprising:
a computer readable memory and a computer readable storage device;
first program instructions to request, by a requester, the information from a source;
second program instructions to pass the information from the requester to a controller comprising a director and an optimizer;
third program instructions to receive instructions from at least one directory, wherein each of the at least one directory is associated with at least one router in a plurality of routers;
fourth program instructions to create, by the optimizer in communication with the at least one directory, a routing plan for routing the information over at least a portion of the plurality of routers; and
fifth program instructions to direct, based on executing the fourth program instructions for creating and by the director in communication with the optimizer, placement of the information on more than one of the plurality of routers,
wherein the first, second, third, fourth, and fifth program instructions are stored on the computer readable storage device for execution by the one or more processors via the computer readable memory.

21. The computer program product of claim 20, further comprising sixth program instructions for routing the information over the at least one router in the plurality of routers, wherein the sixth program instructions are stored on the computer readable storage device.

* * * * *